United States Patent

Kettler et al.

[11] Patent Number: 5,844,597
[45] Date of Patent: Dec. 1, 1998

[54] METHOD OF TRANSMITTING SIGNALS BETWEEN COMMUNICATIONS STATIONS

[75] Inventors: Robert Kettler; Marcellinus J. J. C. Annegarn, both of Eindhoven, Netherlands

[73] Assignee: U.S. Philips Corporation, New York, N.Y.

[21] Appl. No.: 373,737

[22] Filed: Jan. 17, 1995

[30] Foreign Application Priority Data

Jan. 18, 1994 [BE] Belgium ................................ 09400058

[51] Int. Cl.$^6$ ..................................................... H04N 11/00
[52] U.S. Cl. ............................ 348/15; 379/93.21; 348/13
[58] Field of Search .................................. 348/15, 14, 16, 348/578, 13; 379/202, 204, 205, 96, 94, 93, 93.17, 93.19, 93.21, 93.23, 93.01, 90.01; 395/330, 329, 332, 348, 349

[56] References Cited

U.S. PATENT DOCUMENTS

| | | |
|---|---|---|
| 5,014,125 | 5/1991 | Pocock et al. . |
| 5,077,607 | 12/1991 | Johnson et al. . |
| 5,347,306 | 9/1994 | Nitta ........................................... 348/15 |
| 5,491,743 | 2/1996 | Shiio et al. ................................. 348/15 |

FOREIGN PATENT DOCUMENTS 0574138  12/1993  European Pat. Off. .

OTHER PUBLICATIONS

B. Plattner et al, 1988 Intn'l Zurich Seminar on Digital Communications, "Mapping New Applications onto New Technologies", Mar. 8–10, 1988, Zurich/Switzerland, pp. 21–27.

*Primary Examiner*—Stella Woo
*Attorney, Agent, or Firm*—Robert M. McDermott

[57] ABSTRACT

Method of transmitting signals between communication stations via a network, in which a central control station is adapted to transmit a picture of a virtually real ambience to each connected station. In the picture, connected stations are represented by objects which can be displaced by the user of the corresponding station. Other stations such as information sources are represented by stationary objects in the form of buildings. As soon as objects touch or overlap each other, an actual communication connection (for example a telephone conversation, a database consult, a transaction) is established between the corresponding stations. A "chat box" application is also provided, with the particular property that the extent of interaction between conversation partners is dependent on the mutual distance between their corresponding objects in the picture.

10 Claims, 5 Drawing Sheets

5,844,597

METHOD OF TRANSMITTING SIGNALS BETWEEN COMMUNICATIONS STATIONS

BACKGROUND OF THE INVENTION

1. Field of the Invention

The invention relates to a method of transmitting signals between communication stations. Such communication stations may be telephone sets or videophone sets and the transmission of signals may relate to an audio connection, a data connection and/or a video connection between these sets.

2. Description of the Related Art

A generally known method of transmitting signals between communication stations is known from the telephone technique. In this technique, the user selects a predetermined telephone number, whereafter a central switching device realises the connection requested. In this way not only a dialog is possible but also teleconferencing and commercial "chat boxes" are realised in this manner. In a corresponding manner, picture stations can be connected via modern wideband two-way optical or wire-bound networks to information sources for interactive uses such as video-on-demand and teleshopping.

The known method has the drawback that a predetermined selection must be made to realise a connection with another station, for example selecting a telephone number. The existence of the station and its number should be known in advance, for example from advertising commercials in another medium. Whether a station can be reached is neither known in advance. The desired station may be engaged or overloaded.

SUMMARY OF THE INVENTION

It is an object of the invention to provide a novel method which obviates said drawbacks.

In accordance with the invention, the method therefore comprises the following steps: generating a picture in which stations connected to the network are represented by objects at respective picture positions; displacing an object in response to positioning signals generated by a user of the corresponding station; transmitting the generated picture for display to at least two stations represented by a displaceable object, and transmitting signals between the stations in dependence upon the extent to which the picture positions of the corresponding objects correspond to each other.

The method thus provides the possibility of visually indicating which stations are connected to the network and are thus available for communication. A user can displace "his" object across the screen and observe the objects of the other users. This renders "meetings by chance" possible.

In a possible embodiment of the method, the stations are interconnected as soon as the picture positions of the corresponding objects have a predetermined extent of conformity. By positioning an object proximate to the object of another station, an actual communication connection, for example a speech connection will be established between the stations. A user may also evade an unwanted connection with another user by keeping his object out of his neighbourhood.

A very favourable method is obtained if at least one parameter of the signal transmitted between connected stations is dependent on the distance between the picture positions of the objects represented by said stations. For example, when the user has established a connection with a plurality of other users, he will be able to influence the extent of interaction with an individual conversation partner by positioning his object more or less close to his partner's object. In the mixture of speech signals received by a station, the volume of the signals of the other station is then controlled in conformity with the distance to the corresponding objects.

It is even feasible to enable users to opt for a dialog in this "chat box" situation, which dialog cannot be overheard by the other stations. To this end those stations are uniquely interconnected whose picture coordinates still further correspond to each other. This possibility is attractive, notably for teleconference purposes, because it provides the option of consultation between individual participants without disturbing the other participants.

The method is particularly attractive and user-friendly if the generated picture represents a "virtually real" ambience, for example a town with streets and buildings. Objects which are representative of personal communication stations may be shown therein as displaceable persons, while general information sources may assume the shape of stationary buildings. For example, a shop may be accessible to individual users for teleshopping, a videoteque for video-on-demand, a pub for the "chat box", a railway station for public traffic information. If desired, extra liveliness may be suggested in the town by means of pseudo-objects.

In a further embodiment of the method the object corresponding to a communication station can be selected by the user of this station. The user can then select or compose the object himself, which object is displayed on the display screen for his station.

In another embodiment an attribute of a displayed object is controlled by a parameter of the signal of the corresponding station. It is thereby achieved that, for example the mouth of an object shown as a face moves up and down in synchronism with the speech signal of the relevant station. A user can then observe on the display screen which object is coupled to which voice.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
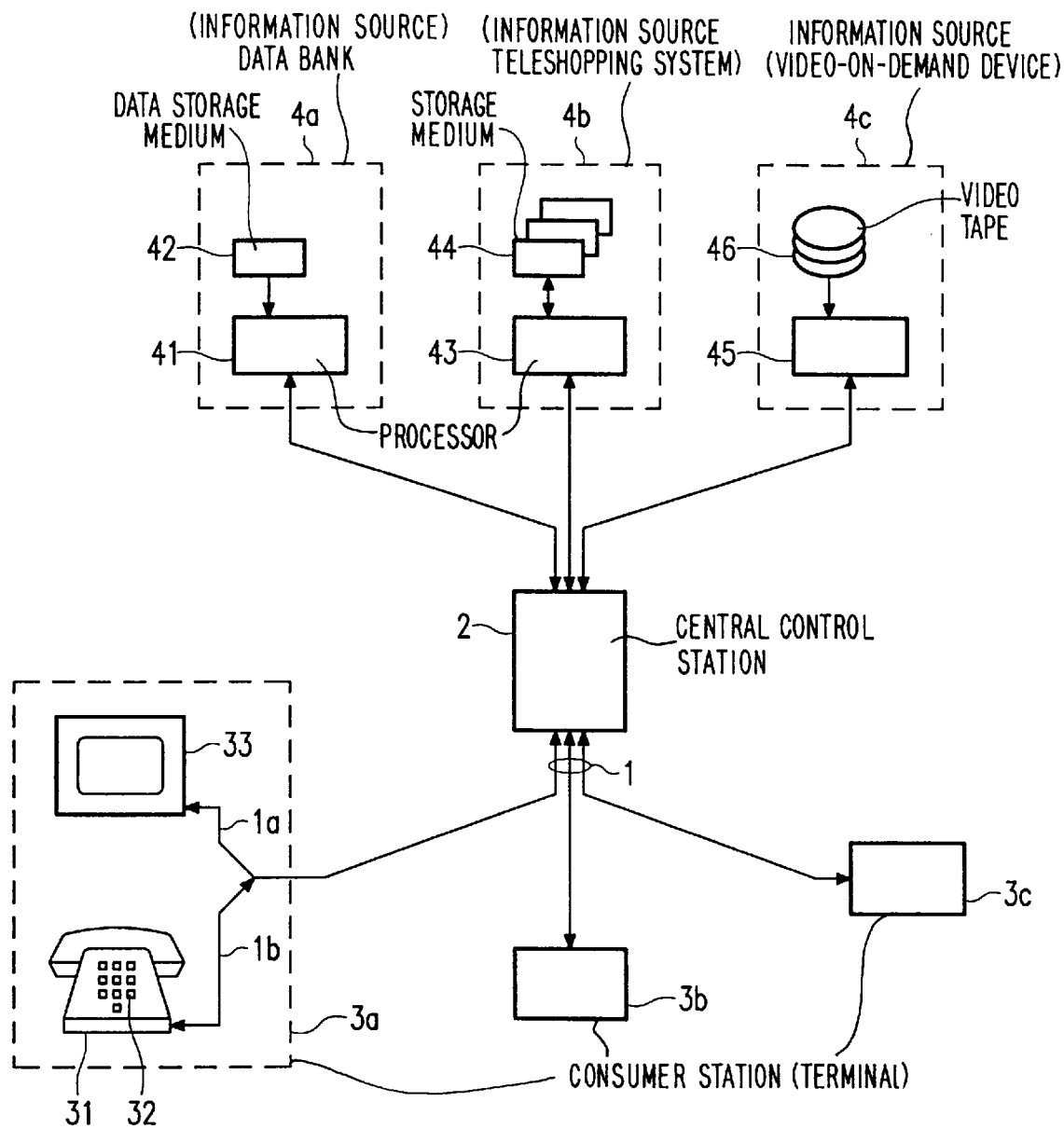
FIG. 1 shows a device for performing a method according to the invention.

FIG. 1 shows a device for performing a method according to the invention. The device comprises a network 1 to which a central control station 2 and a plurality of consumer stations 3a–3c are connected. The consumer stations will hereinafter be briefly referred to as terminals. The network may be a wide-band optical or wire-bound network, a telephone network, a data network or the like. In this embodiment the network is assumed to be a combination of a cable TV network 1*a* and a telephone network 1*b*.

The terminals 3*a*–3*c* have a mutually equal structure. As is shown in the Figure for terminal 3*a*, each terminal comprises only one telephone set 31 and a television receiver 33 in a very simple embodiment. The television receiver is provided with a teletext decoder and receives television signals via the cable TV network 1*a*. The receiver is assumed to be tuned to a cable TV channel which is allocated to a transmitter which may be incorporated in the control station 2. The telephone set is connected to the telephone network 1*b* in the conventional manner. By means of the keys 32 of the set, not only a connection with the control station can be established but also commands and selections can be passed on during the connection. More particularly, positioning signals can be passed on by means of the keys 32 for positioning an object still to be defined on the display screen of the television receiver.

The control station 2 is coupled to information sources 4*a*–4*c*. In this embodiment it has been assumed that the information sources are arranged proximate to the control station and directly connected thereto. If desired, the information sources may be geographically far remote. In that case the connection may also be realised via the network 1.

In this embodiment, information source 4*a* represents a data bank in which data on public traffic have been stored. The data bank comprises a processor 41 and a data storage medium 42 and may be coupled to a terminal via the control station and the network. Information source 4*b* represents a teleshopping system. It comprises a processor 43 and a storage medium 44 in which product information is stored. Such a teleshopping system, by means of which transactions can be concluded, is described, inter alia in International Patent Application WO 90/13088. Information station 4*c* represents a video-on-demand device. The device comprises a multiple video cassette recorder 45 which is coupled to a plurality of video tapes 46. By means of the device, a selected video tape can be played back and transmitted for display to one of the terminals 3*a*–3*c* via the network. Such a device is described, for example in European Patent Application EP-A 0 396 062.

Figure 2:
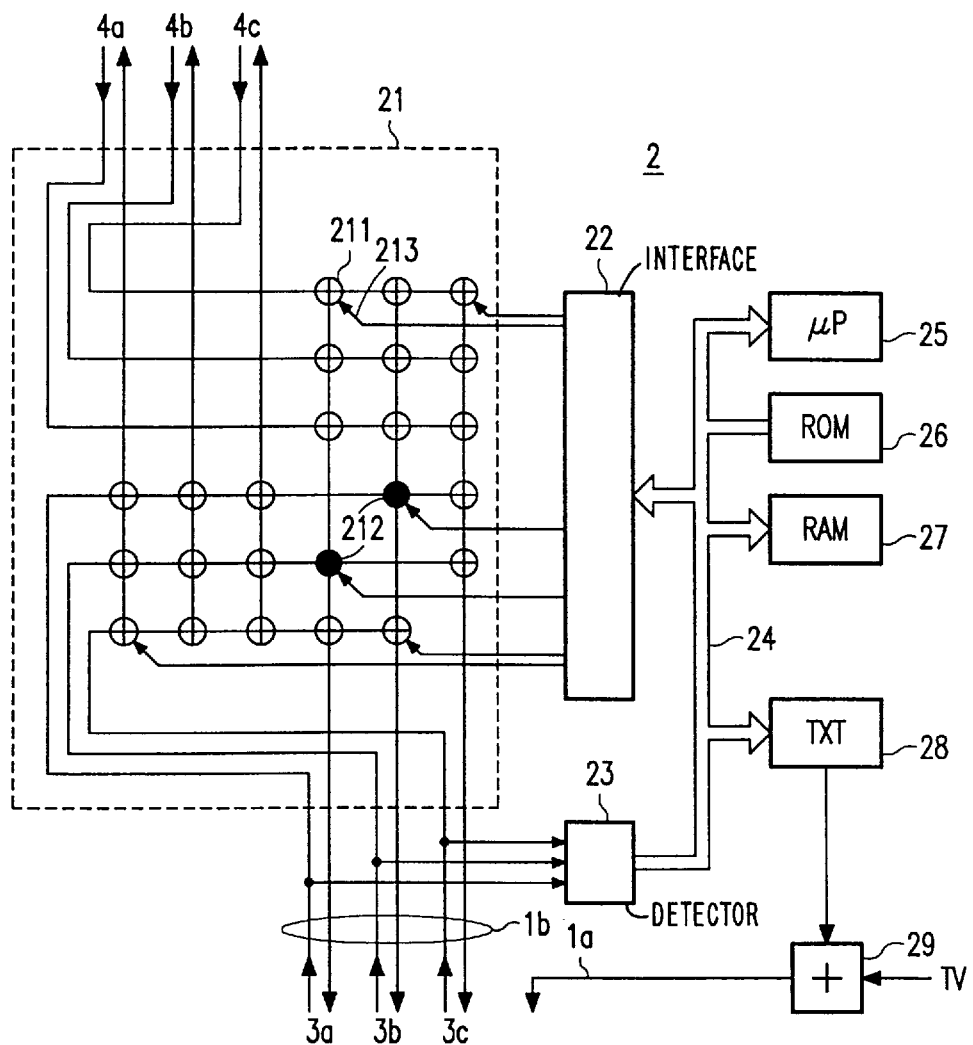
FIG. 2 shows the structure of a control station shown in FIG. 1.
Figure 3A:
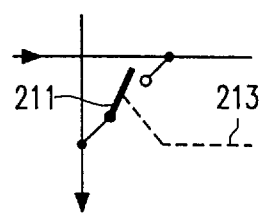
FIG. 3 shows some embodiments of a connection element shown in FIG. 2.
Figure 3B:
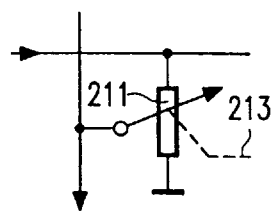

The control station 2 is shown in greater detail in FIG. 2. It comprises a connection matrix 21 by means of which the incoming and outgoing signal leads of terminals 3*a*–3*c* and information sources 4*a*–4*c* can be coupled together by means of electronically controlled connection elements 211. These elements may be on/off switches, as shown in FIG. 3A. However, they may also be adapted to control a signal parameter. An embodiment thereof is shown in FIG. 3B indicating that each connection element is constituted by an electronically controllable amplifier with which the volume of the sound signals can be controlled. The connection elements are controlled by an interface 22 via control connections 213, only some of which are shown in FIG. 2. The incoming signals of terminals 3*a*–3*c* are also applied to a signal detector 23. This detector may be implemented in further known manner as a pulse tone detector which is adapted to determine during a connection which of the keys of the telephone set 31 (see FIG. 1) is depressed.

The interface 22 and detector 23 are coupled to a central processor 25 via a communication bus 24. A ROM 26 and a RAM 27 in which fixed and variable program data, respectively, are stored are connected to the communication bus. A picture generator 28 is also connected to the communication bus. This generator is constituted by a teletext device in this embodiment. The generated teletext signal is superimposed in further known manner on a television signal TV by means of a mixer circuit 29. The signal thus obtained is distributed via the cable TV network 1*a*.

Figure 4:
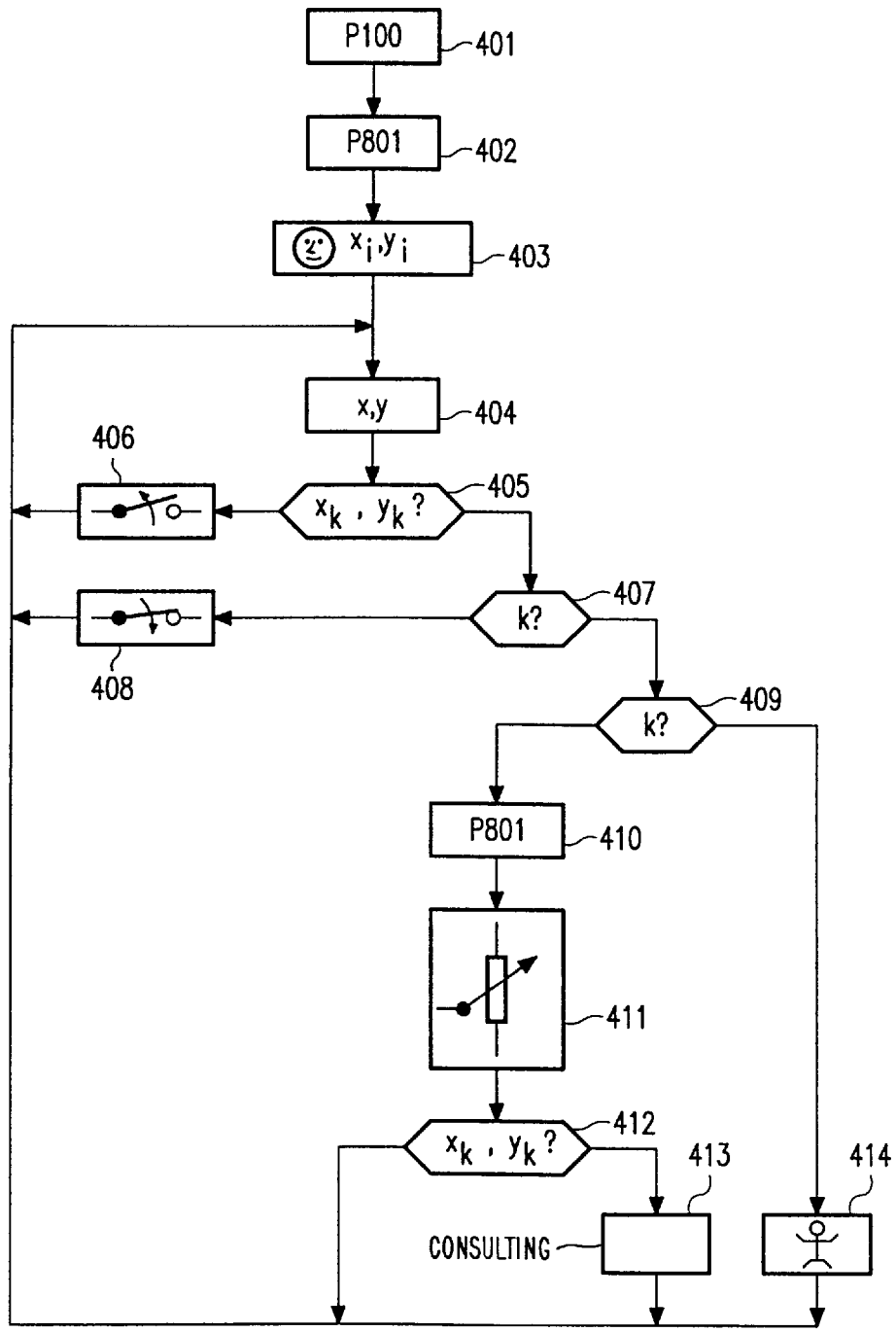
FIG. 4 shows the flow chart of a control program performed by a processor shown in FIG. 2, FIGS. 5 and 6 show examples of pictures transmitted by the control station shown in FIG. 1.

The method of the system shown in FIG. 1 is determined by a control program stored in ROM 26 and performed by the central processor 25. FIG. 4 shows the flow chart of an embodiment of this control program. It comprises an initial step 401 in which a predetermined teletext index page is generated and cyclically transmitted via the cable TV channel allocated to the control station. By means of this teletext index page, for example page 100, consumers are informed about the new interactive communication service. The page comprises, inter alia the telephone number which is to be selected for this purpose. The television receiver is supposed to remain in the teletext mode.

Subsequently, the steps will be elucidated which are performed by the central processor after the user of terminal 3*a* has established a telephone connection with the control station. It is assumed that terminals 3*b* and 3*c* are already connected to the control station. In a step 402 an individual teletext page is allocated to the user. By means of synthetic speech, he is informed of this number, for example page 801. The user is supposed to select this page number by means of the hand-held remote control unit of his television set. It is to be noted that other teletext page numbers, for example 802 and 803 may be allocated to the terminals 3*b* and 3*c* already connected.

In a step 403 a predetermined object is allocated to the relevant terminal. To this end a plurality of objects is stored in RAM 27 (see FIG. 2) of the control station. Moreover, the central processor generates a picture which is transmitted in the form of teletext page 801 by the teletext device 28 (see FIG. 2). The object is shown in the picture at an initial position with picture coordinates $(x_i, y_i)$. The objects allocated to the other connected terminals are also shown in the same picture.

Figure 5:
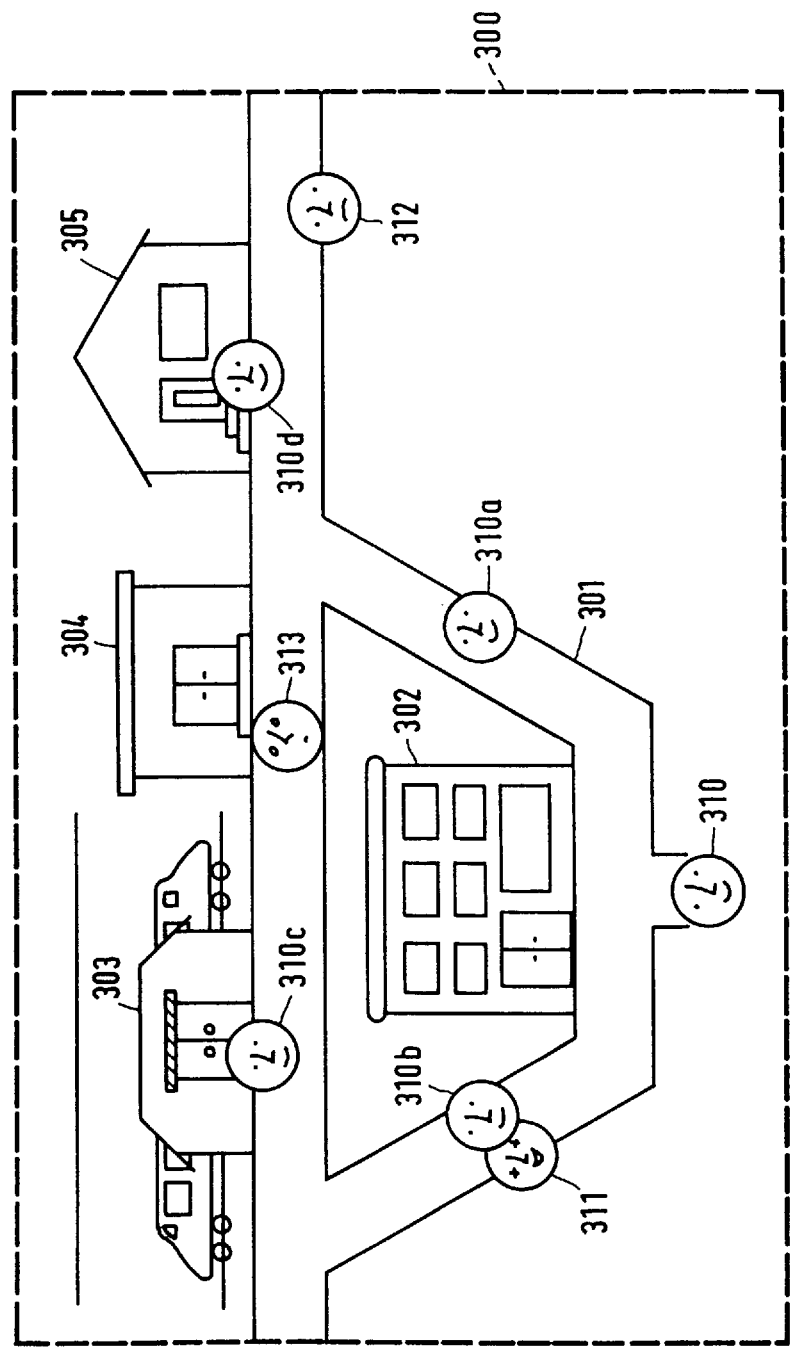

For the purpose of illustration, FIG. 5 shows an example of a picture 300. It represents a virtually real ambience comprising streets 301 along which objects are located such as a department store 302, a railway station 303, a videoteque 304 and a pub 305. The terminals 3*a*–3*c* are represented by objects 310–312. To enliven the ambience, pseudo-objects 313 which do not correspond to a connected terminal may be included in the picture.

In a step 404 (see FIG. 4) key touches are received which are performed by the user of terminal 3*a* on the keyboard of his telephone set. To this end some keys are intended as positioning keys (left, right, up, down). By means of these keys the user can move "his" object across the display screen. After each touch of the key the central processor refreshes the picture (i.e. teletext page 801) and transmits this picture in order that the user can immediately observe the result of the positioning. For the purpose of illustration, a different position of the user in FIG. 5 is denoted by 310*a*. In the step 404 the processor also refreshes the teletext pages 802 and 803 shown on the display screen of terminals 3*b* and 3*c*, respectively. Thus, the other users can also observe the movements of object 310.

In a step 405 it is ascertained whether the picture coordinates (x,y) of object 310 correspond to a predetermined extent to the picture coordinates $(x_k, y_k)$ of a station k. Station k may be a building which is represented by one of the stationary objects 302–305 or another terminal which is represented by one of the movable objects 311–312. If the picture coordinates do not correspond to a sufficient extent, the control program performs a step 406 in which the terminal remains disconnected from other stations. The control program subsequently returns to step 404. If the picture coordinates correspond to a sufficient extent, for example because the objects touch or overlap each other, the control program ascertains in a step 407 which station the other object corresponds to.

If station k is one of the terminals 3b–3c, a step 408 will be performed. In this step the connection matrix 21 (see FIG. 2) is controlled in such a way that an actual communication connection is established between terminal 3a and station k. For the purpose of illustration, FIG. 5 shows the situation in which the objects 310b and 311 touch each other so that terminal 3a is connected to terminal 3b. In FIG. 2 this communication connection is denoted by connection elements 212.

Both users can now talk to each other. Without knowing each other's telephone number, they have met in the virtually real ambience. If desired, both users can move their objects synchronously so that, walking through the ambience, they remain in contact with each other. It is also possible that more than two objects meet each other so that a "chat box" application is realised. The connection is maintained until one of the parties decides to displace his object in such a way that the picture coordinates correspond to an insufficient extent. In that case the relevant connection between the stations is interrupted in the step 406.

If the station k is one of the buildings 302–304 shown on the display screen, the terminal is connected in the step 408 to one of the information sources 4a–4c (see FIG. 1). More particularly, the department store 302 in FIG. 5 corresponds to teleshopping system 4b, the railway station 303 corresponds to data bank 4a and the videoteque 304 corresponds to the video-on-demand device 4c. As soon as the picture coordinates of object 310 correspond to a sufficient extent to the picture coordinates of a building (or the entrance to that building), the connection between terminal 3a and the relevant information source is established. The relevant connection may be a real or synthetic speech connection, a music connection, a data connection or a picture connection. If desired, the display screen of the terminal is used for interactive picture communication by means of a menu. The display of the virtual real ambience is then interrupted temporarily and for the sake of consistency with the ambience, the object 310 acquires the function of menu cursor. FIG. 5 shows by way of example that the user (object 310c) enters the railway station 303 to consult the railway timetable.

Figure 6:
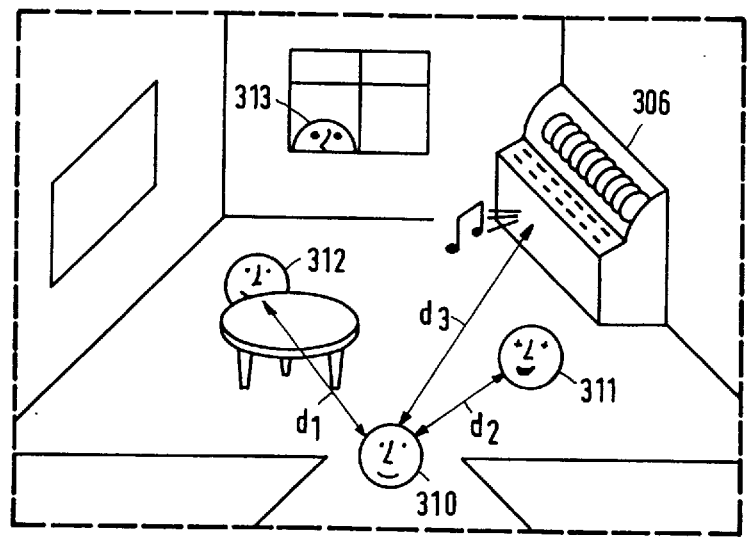

In a step 409 it is ascertained whether station k is the pub 305. In FIG. 5 this situation is shown by means of object 310d. In this case a step 410 is performed in which the central processor generates a new picture. This new picture, an example of which is shown in FIG. 6, shows the interior of the pub. As has been attempted to show, other users may be present in the pub in addition to the user of terminal 3a. More particularly, FIG. 6 shows that in addition to the user of terminal 3a (object 310), also the users of terminals 3b and 3c (objects 311 and 312), respectively, have entered the pub. In this embodiment, the pub is distinguished from the "street" by the following aspects:

(1) as a criterion for realising the connection between terminals, the presence in the pub of the objects corresponding thereto is sufficient. Mutual touching or overlapping of the object is no longer necessary.

(2) a signal parameter for the connection between terminal 3a and terminals 3b, 3c is dependent on the distance to the relevant objects. To this end the control program performs a step 411 (see FIG. 4) in which the sound volume of the speech signals of the other users is controlled in conformity with the distance ($d_1$, $d_2$) from their object to object 310.

Just as with the known "chat boxes" the users can talk to one another in this way, but each user can now individually influence the extent of interaction with other conversation partners by means of the positioning keys on his telephone set.

It is to be noted that it is alternatively possible to influence the extent of interaction in dependence upon the orientation of an object. This is understood to mean a predetermined directional sensitivity which is allocated to the object. In the embodiment in question, in which an object takes the shape of a human face, it is, for example feasible that a sound signal becomes louder as an object representing the sound source is further in the "field of view" of the object corresponding to the listening station.

As has been attempted to show in FIG. 6, there is a juke-box 306 in the corner of the pub. This juke-box represents a CD player which is arranged in the control station (not shown in FIG. 1). The sound of this CD player is mixed with the speech signals, also in conformity with the distance ($d_3$) to object 310. The juke-box thus provides background music. In analogy with the method described hereinbefore, a user can go to the juke-box to select a music title.

In a step 412 (see FIG. 4) of the "pub" application it is once more ascertained in how far the picture coordinates of objects correspond to each other. If two objects touch or overlap each other, a step 413 will be performed in which the relevant users can consult each other. This is understood to mean that their speech signals are not passed on to the other terminals. In practice, this facility is sensible if the room represents a conference hall or the like. Users can then consult each other without being overheard by others. It is possible to activate this facility only after a predetermined key of the telephone set has been depressed. The consultation mode can thus be made known to others, for example by giving the relevant objects a predetermined colour.

In the embodiment described above, the objects corresponding to the terminals 3a–3c are identical or substantially identical. In practice it is sensible that they are well distinguishable. To this end the central processor allocates a different colour or shape to each object in the step 403. However, it is also sensible to provide a user with the facility of choosing or composing an object himself. To this end, FIG. 4 shows a step 414 which is performed if the user visits a further building (not shown in FIG. 1) so as to give it an image. The step 414 comprises the selection of the shape, colour, dimension and the like of an object from selection facilities offered to the relevant user.

Figure 7:
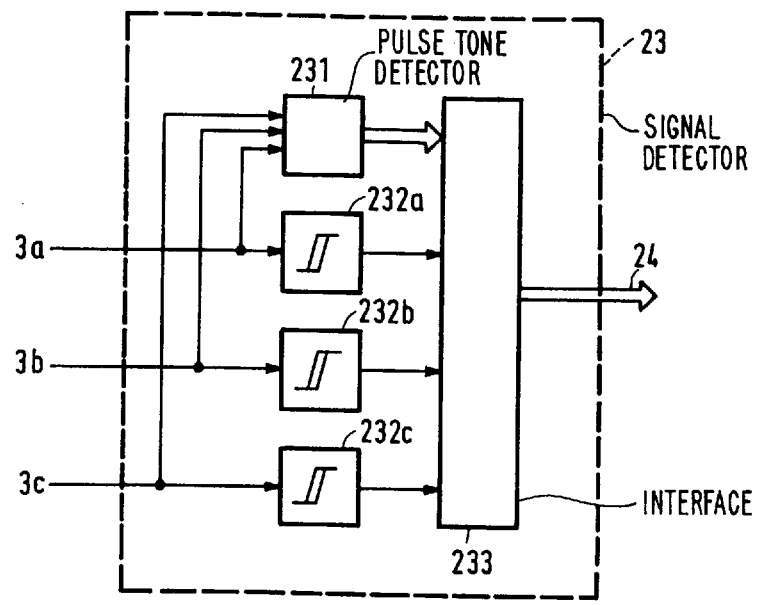
FIG. 7 shows an embodiment of a signal detector shown in FIG. 2.

FIG. 7 shows a further embodiment of the signal detector denoted by the reference numeral 23 in FIG. 2. In addition to the previously mentioned pulse tone detector, which is denoted by 231, this signal detector also comprises a plurality of threshold detectors 232a–232c. The threshold detectors receive the speech signal from the terminals 3a–3c and generate a detection signal as soon as the sound level of the speech signal exceeds a predetermined threshold. The detection signals are applied to the central processor 25 (see FIG. 2) via an interface 233 and communication bus 24. This processor is now adapted to control an attribute of the corresponding object in response to such a detection signal. More particularly, this control is realised in step 404 (see FIG. 4) of the control program. For example, the mouth of an object shown as a human face can be opened or closed in dependence upon the loudness of the voice. Each user can then observe on the display screen which object is coupled to which voice.

In the previous embodiment, notably those technologies (telephone set, television receiver with teletext decoder, telephone network, cable TV network) are used which are nowadays generally available to consumers. Future systems may, however, similarly make use of more modern techniques such as wideband interactive optical or wire-bound networks, data networks, data terminals, videophone sets, high-resolution graphic picture generators, video-on-demand devices, etc.

We claim:

1. A method of transmitting signals between communication stations via a network, comprising the steps of:
    generating a picture in which each station which is connected to the network is represented by a station object;
    positioning each station object within said picture in response to positioning signals communicated by each station, each of said station objects thereby having a station position within said picture;
    transmitting the generated picture with said station objects at their respective station position;
    determining the extent to which an at least one station's position within said picture corresponds to an at least one other station's position; and
    transmitting signals between the at least one station and the at least one other station in dependence upon the said extent to which their station positions correspond.

2. A method as claimed in claim 1, wherein two or more stations are interconnected in dependence upon the extent of correspondence of their station positions.

3. A method as claimed in claim 1, wherein at least one parameter of the transmitted signal is dependent on the distance between the station positions.

4. A method as claimed in claim 3, wherein the transmitted signal comprises sound signals having an amplitude, and the signal parameter is constituted by the amplitude of said sound signals.

5. A method as claimed in claim 3, wherein stations are uniquely interconnected at a still further extent of correspondence of station positions.

6. A method as claimed in claim 1, wherein the station object further has an orientation in dependence upon the positioning signals and wherein at least one parameter of the transmitted signal is dependent on the mutual orientation of the corresponding station objects.

7. A method as claimed in claim 6, wherein the transmitted signal comprises sound signals having an amplitude, and the signal parameter is constituted by the amplitude of said sound signals.

8. A method as claimed in claim 6, wherein stations are uniquely interconnected at a still further extent of correspondence of station positions.

9. A method as claimed in claim 1, wherein the station object corresponding to a station can be selected by a user of said station.

10. A method as claimed in claim 1, wherein an attribute of a displayed object is controlled by a parameter of the signal of the corresponding station.

* * * * *